Figure 1:
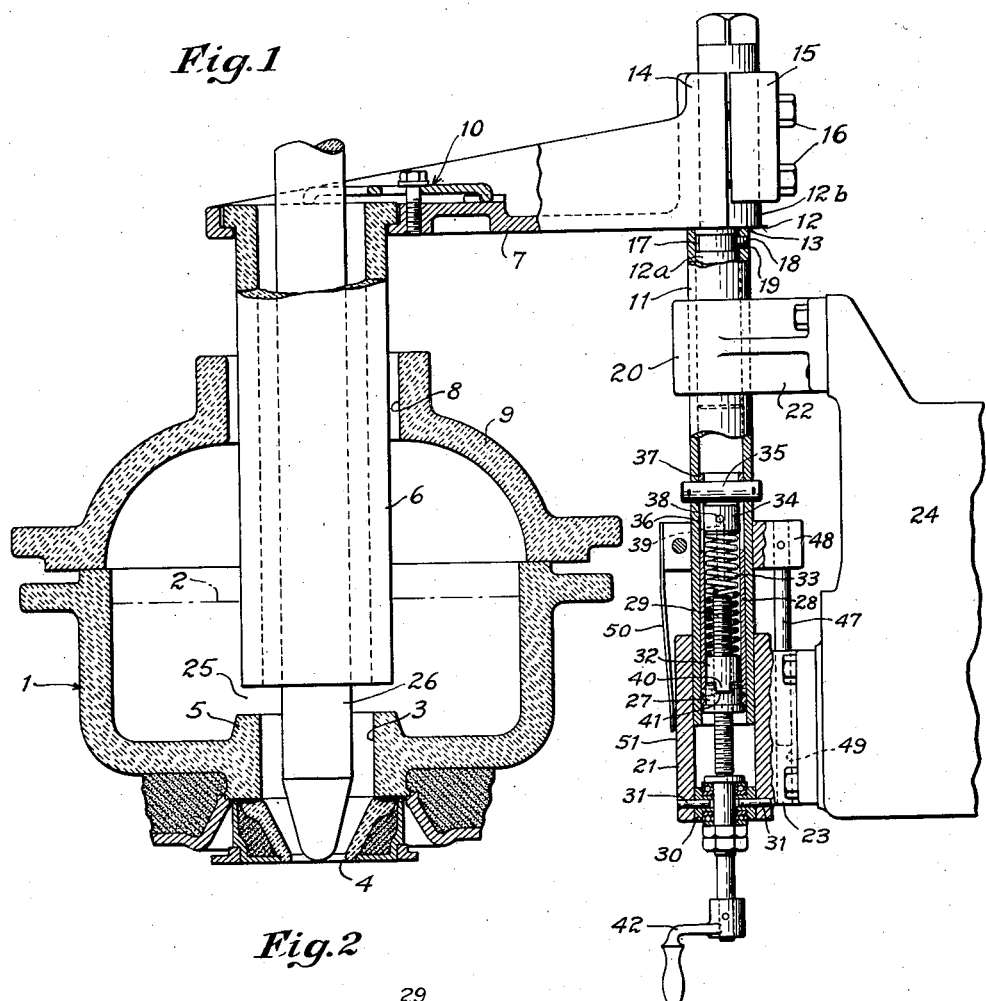

Aug. 16, 1949.  M. A. KOLEDA  2,479,121

GLASS FEEDER TUBE ADJUSTING MECHANISM

Filed March 21, 1946

*Inventor:*
*Michael A. Koleda* by Parham + Bates
*Attorneys.*

Patented Aug. 16, 1949

2,479,121

UNITED STATES PATENT OFFICE 2,479,121

GLASS FEEDER TUBE ADJUSTING MECHANISM

Michael A. Koleda, Rocky Hill, Conn., assignor to Hartford-Empire Company, Hartford, Conn., a corporation of Delaware Application March 21, 1946, Serial No. 656,063

2 Claims. (Cl. 49—55)

1

This invention relates to improvements in the tube supporting and adjusting mechanism of a glass feeder that is known in the art as the Hartford-Empire single feeder, an example of which is disclosed in U. S. Patent No. 1,760,254, granted May 27, 1930, to Karl E. Peiler, assignor to Hartford-Empire Co.

The particular mechanism that is improved by this invention is shown in detail in Figs. 13 to 18, inclusive, of the drawings and described in the specification of the patent, particularly in the portion thereof beginning with line 90 on page 7 and extending through line 35 on page 8 thereof.

The tube referred to is a vertically disposed refractory tube which is suspended from an overhanging arm so as to depend in the molten glass in the feed bowl or spout of the glass feeder above the glass feed outlet in the bottom of the bowl or spout and to be adjustable vertically toward and away from the upper end of the outlet to vary the height of the flow passage for glass from the feeder bowl or spout chamber into the outlet thereof, whereby to regulably control the weight of glass in charges which are severed at regular intervals of time from successive charge masses which have issued from the outlet and have been formed in suspension therefrom. In the Hartford-Empire single feeder as disclosed in the aforesaid patent, the tube-carrying arm is clamped at one end to a vertically disposed, vertically movable tubular rod. A vertically slidable sleeve is located in the lower portion of this rod. A cross pin that is fixed in position in the rod extends through a vertically slotted portion of the sleeve near but below the upper end of the latter. A nut is fixed in place in the lower portion of the sleeve. A non-rotary, vertically movable plunger is provided in the sleeve below the cross pin and normally is pressed against the latter by a compression coil spring which is located in the sleeve between the plunger and the nut. A vertically disposed, rotatably mounted adjusting screw extends upwardly through the nut, with which it is threadedly engaged, and has an operating crank on its lower end. The adjusting screw is held against axial movement by its mounting. When the adjusting screw is turned in the direction to raise the tubular rod, with its overhanging arm and suspended feeder tube, a lifting force is applied thereto through the compression coil spring, the plunger and the cross pin and hence will be cushioned by the coil spring which may be further compressed to exert an increasing pressure should the glass be sufficiently viscous to impede upward movement of the tube. The pressure of the screw may be exerted directly through the sleeve to the cross pin and thence to the tubular rod when the adjusting screw is turned in the direction to effect lowering of the tube in the glass.

Feeders which include tube supporting and adjusting mechanisms substantially as above described have been widely used for many years and the mechanisms therein have been found to be generally satisfactory. However, they have been found in actual practice to have certain shortcomings which this invention aims to cure.

One of these shortcomings is that wear on the relatively moving threads of the adjusting screw and nut of the mechanism will cause an increasing backlash or lost motion between these parts which, in time, will make it difficult for an operator of a feeder to know whether or not a slight turning of the adjusting screw crank handle with the intention of effecting a corrective adjustment of the position of the feeder tube has actually effected such adjustment or merely taken up backlash or lost motion. Since operators are accustomed to use the feeder tube position adjustment to secure and maintain proper weight of the charges produced by the feeder, it is of importance that the mechanism used to effect such adjustment should be reliable and should act instantly to effect the adjustment desired. The present invention provides a supplemental nut on the adjusting screw between the main nut and the compression coil spring and constructs and relatively arranges these parts for mutual cooperation so that relative axial movement between the main nut and the supplemental nut will be automatically effected by the pressure of the coil spring to obviate any possible backlash or lost motion because of wear on the relatively moving threads of the device.

Another shortcoming of the prior mechanism is that it lacks any fore-and-aft adjustment of the position of the tube-carrying overhanging arm to secure or maintain axial alignment of the tube and feeder outlet or for any other desirable purpose. This can be effected only by inserting a shim or shims between the arm and its supporting tubular rod to adjust the arm longitudinally in one direction or by removing a shim or shims or planing off material of the arm to adjust it longitudinally in the opposite direction. Neither of these adjustments can be made quickly or easily and care and skill must be used to insure desirable accuracy thereof. The present invention cures this shortcoming by making the arm-supporting rod in two connected sections, the upper of which is angularly adjustable in the lower and has a latterly offset or eccentric upper end portion to which one end of the arm is clamped. By loosening the fastening devices of this portion of the mechanism, the arm can be adjusted longitudinally in either direction quickly, easily and accurately and secured in adjusted position by again tightening such fastening devices.

Figure 2:
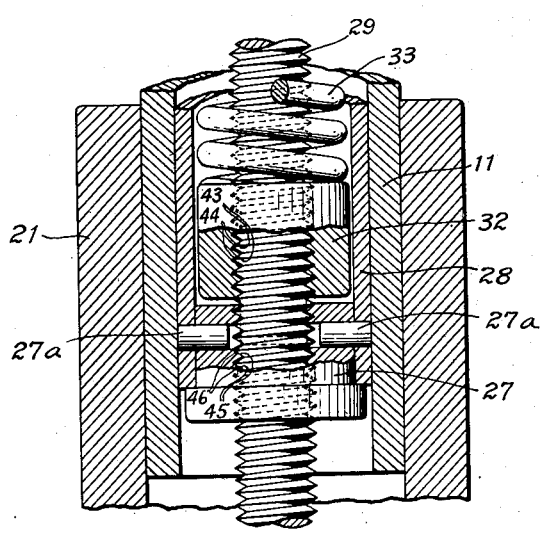

Further objects and advantages of the invention hereinafter will be pointed out or will become apparent from the following description of a practical embodiment of the invention, as shown in the accompanying drawings, in which:

Fig. 1 is a view showing the improved tube supporting and adjusting mechanism operatively applied to the feed bowl or spout portion of a glass feeder so as to support a feeder tube operatively therein, the view being mainly in side elevation with parts broken away and other parts shown in section; and Fig. 2 is a relatively enlarged fragmentary vertical sectional view, showing details of the relatively movable cooperative adjusting elements of the mechanism.

In Fig. 1, the numeral 1 deignates a feed bowl or spout which, in normal operation of the feeder of which it is a part, may contain molten glass (not shown) to a level indicated by the dot-and-dash line 2. The bowl or spout 1 has a glass feed outlet in its bottom. This outlet, in the example shown, comprises a well 3 which is open at its top and is provided at its bottom with a central discharge orifice 4. The upper portion of this well is formed to provide an upstanding curb, designated 5, on the bottom of the bowl or spout but this is not an essential feature of the invention as the well or outlet might be flush at its upper end with the bowl or spout bottom.

The feeder tube, designated 6, usually is refractory but might be of any suitable heat-resistant material. It is suspended from the outer end portion of an overhanging arm 7 so that it depends through a suitable opening 8 in the top or cover portion 9 of the feeder bowl or spout 1 in line with and to a level located at a predetermined height relative to the curb 5 at the upper end of the well 3. The tube may be fastened detachably to the outer end portion of the arm 7 in any suitable way, as by the mechanism generally indicated at 10.

The arm 7 is carried by a vertically disposed rod which comprises a relatively long or main lower section 11, which may be tubular as shown, and a cooperative upper section 12 which need not be tubular but may be so, if desired. The upper section 12 comprises a lower portion 12a which sets rotatively in the tubular rod section 11 and an upper portion 12b which is laterally offset from or eccentric to the lower portion 12a. The upper portion 12b may be larger diametrically than the lower portion 12a. Because of this feature and/or the laterally offset or eccentric position of the portion 12b, a downwardly facing shoulder 13 is provided on the rod section 12 to rest upon the upper end of the rod section 11.

The arm 7 is mounted on the eccentric upper portion 12b of the rod section 12 so that it may be angularly adjusted about the axis of its support and also may be adjusted fore-and-aft by swinging the eccentric upper portion 12b of the rod section 12 angularly about the axis of the lower portion 12a thereof. These adjustments or either of them may be employed to bring the tube 6 into axial alignment with the outlet or to maintain such alignment or for any other desirable purpose. As shown, the means for fastening the arm 7 in place on the upper portion 12b of the supporting rod is in the form of a clamp comprising one part, designated 14, which may be integral with the end portion of the arm, and a cooperative separately formed part, designated 15, fastened to the part 14 by cap bolts 16. The lower portion 12a of the upper section of the rod may be provided with a groove 17 to accommodate the end of a set screw 18 which is threaded through a suitable hole 19 in the tubular rod section 11. When the set screw 18 has been tightened against the bottom of groove 17, the upper section of the rod will be secured in an angularly adjusted position in the tubular rod section 11 and the fore-and-aft adjustment of the arm 7 and its suspended feeder tube 6 will thus be attained. The set screw 18 may be loosened sufficiently to permit any desired fore-and-aft adjustment of the arm 7 while still projecting into the groove 17 sufficiently to prevent upward displacement of the rod section 12 from the tubular rod section 11.

The tubular rod section 11 is slidable vertically in spaced bearings 20 and 21, respectively, in bracket arms 22 and 23 respectively. These bracket arms may be attached to a stationary support 24 or might be integral parts thereof. The support 24 may be any convenient stationary supporting member.

The supporting rod 11, 12 may be adjusted vertically to adjust the lower end of the feeder tube 6 in relation to the well curb 5 from a zero position, at which the feeder tube rests upon the curb and shuts off all flow of glass to the well, to a higher or raised position, such as that shown in Fig. 1. In its raised position the lower end of the tube cooperates with the curb 5 to define between them an annular passageway, designated 25, for the inflow of glass from the feeder spout or bowl to the well 3. The distance above the curb 5 at which the lower end of the tube 6 is located will of course determine the size of the inflow passage 25 to the well. This will determine the weight of glass issuing from the orifice 4 in a given time, as between successive glass severing operations of an associate glass severing mechanism (not shown). Vertical adjustment of the tube thus may be employed to regulably control the weight of the glass mold charges produced by the feeder. A vertical plunger 26, made of refractory or of any other suitable heat-resisting material, is partially shown in Fig. 1 as depending through the tube 6 into the well 3. The plunger 26 may be supported and operated by any suitable mechanism (not shown), such as that disclosed in the aforesaid Peiler Patent 1,760,254, so as to cooperate with the tube 6 to control the formation of the mold charges produced by the feeder.

The means for adjusting the supporting rod 11, 12 vertically comprises a main nut 27, fixed in place as by pins 27a, Fig. 2, in the lower end portion of an internal sleeve 28, which is slidably disposed in the lower portion of the tubular rod section 11. A vertically disposed adjusting screw 29 which is journaled in a bushing 30 that is fixed in place, as by the pins 31, in the lower portion of the bearing 21, is threaded through the nut 27 and projects above the latter a substantial distance in the sleeve 28. A secondary or auxiliary nut 32 is threaded on the screw 29 within the sleeve 28 at a predetermined distance above the main nut 27.

A coil spring 33 is interposed between the secondary nut 32 and a plunger 34 which is reciprocably disposed within a higher portion of the sleeve 28. A cross pin 35 in the tubular rod section 11 extends transversely through a vertically slotted portion 36 of the internal sleeve 28. The spring 33 is compressed so as to hold the plunger 34 against the cross pin 35, which is carried by the rod section 11. The spring 33 also urges the internal sleeve 28 downwardly and yieldingly maintains it at the limit of its downward sliding movement in the rod section. This is determined by the engagement of the cross pin 35 with the upper end portion 37 of the sleeve, this being at the upper end of the slotted portion 36 of such sleeve. The plunger 34 is prevented from turning or rotating around its axis within the sleeve 28, as by a pin 38 carried by the plunger and working in a vertical slot 39 in the internal sleeve 28.

The secondary nut 32 has a downwardly extending projection or tongue 40, fitting slidably in a cooperative recess 41 in the upper end of the main nut 27. In assembling the adjusting mechanism, the secondary nut 32 may be placed on the screw 29 any predetermined distance from the main nut that is less than the length of the projection 40. An initial spacing of approximately $\frac{1}{16}$ of an inch may be selected.

The projection 40 may be substantially rectangular in shape and the recess 41 may be similarly configured, thus providing sliding contact between substantially straight parallel side walls of the tongue and its cooperative recess.

The adjusting screw 29 may be turned conveniently by a crank handle 42 which, in practice, may be considerably longer than that shown in Fig. 1. When thus turned in the proper direction, motion will be imparted through the coil spring 33, the plunger 34, and the cross pin 35 to the vertically movable, supporting rod 11, 12, whereby to raise the arm 7 and the suspended feeder tube 6 relative to the feeder outlet. When the adjusting screw is turned in the opposite direction, a downward pull on the supporting rod 11, 12 will be exerted from the screw through the nut 27, internal sleeve 28 and cross pin 35. The spring 33 serves as a safety element in the event the glass in the feeder bowl or spout is cold enough to impede upward adjustment of the tube 6 from a previous position, as from its completely lowered position on the curb 5. The spring will then cushion the connection between the adjusting parts so that the feeder tube 6 will be raised gradually without damaging it by the yielding but increasing pressure of the spring.

Feeder operators are accustomed to use the adjustment of the feeder tube 6 relatively to the upper end of the feeder outlet to correct the weight of the charges or to maintain the desired weight. It therefore is desirable that a slight turning of the handle of the adjusting screw should cause a corresponding adjustment of the feeder tube and that the effect thereof should not be lost in whole or in part because of backlash or lost motion resulting from wear on the threads of the adjusting screw and the cooperative nut means. These threads do wear but backlash or lost motion which otherwise would be caused thereby is obviated in the operation of the improved adjusting mechanism of the present invention. As the relatively moving thread surfaces wear, the compression spring 33 will automatically force the secondary nut 32 downwardly relative to the main nut 27 so that the upper surface 43 of each convolution of the thread in the secondary nut 32 will be forced continuously against the upper surface 44 of the engaged portion of the adjusting screw 29, as indicated in Fig. 2. At the same time, the pressure of the spring will be transmitted through the cross pin 35, rod section 11, and internal sleeve 28 to the main nut 27 so as to cause an upward pull on the latter. This will maintain the lower surface 45 of each convolution of the thread of the main nut 27 against the lower surface 46 of the engaged portion of the thread of the adjusting screw 29, also as shown in Fig. 2, so as to take up wear on these parts. Thus, there will be an automatic take-up of wear between the threads of the adjusting screw and the nut means thereon. As wear occurs and is compensated, the auxiliary and main nuts are automatically adjusted closer together.

The supporting rod 11, 12 may be held against turning in its bearings, as by a guide pin 47, depending from a collar 48 fastened on the tubular section 11, the pin 47 depending slidably in a suitable vertical opening 49 in the stationary part 23. The collar 48 may carry a depending finger 50, the lower free end portion of which is supported to move vertically relative to a suitable vertical surface 51 on the stationary bearing 21. This surface may be provided with graduations (not shown) with which the finger 50 may cooperate to indicate to the operator the adjusted position of the feeder tube at any time.

I do not wish to be limited to the precise details of the illustrative embodiment shown in the drawings and herein described as many changes therein or modifications thereof will now be obvious or will readily occur to those skilled in the art.

I claim:

1. In a glass feeder, a mechanism for supporting and adjusting vertically a vertically adjustable element, said mechanism comprising a vertically movable carrier for said element, said carrier comprising a vertically movable vertical rod, said rod being tubular from its lower end for at least part of its length, a nut, means to mount said nut slidably and non-rotatably in the tubular rod, an adjusting screw adapted for threaded engagement with said nut, means to mount said screw operatively at a fixed level so that said screw extends vertically through said nut in threaded engagement therewith and in the tubular rod for a substantial distance above said nut, an internal abutment fixed to said tubular rod at a position therein spaced vertically above said screw, an auxiliary nut on said screw at a slight distance above said first nut, means interconnecting said nuts to permit only relative axial movement between them, and a compression coil spring in said tubular rod between said internal abutment and said auxiliary nut, whereby cushioned upward pressure on said abutment and thence to said rod will be applied through said spring to lift said rod when said screw is turned about its vertical axis in one direction and pressure will be exerted downward on said auxiliary nut to adjust its position on said screw relative to said first nut to compensate for wear on the co-engaging threads of said screw and auxiliary nut, and wherein said vertical rod comprises an upper section having a laterally offset or eccentric vertical upper portion angularly adjustable around the vertical axis of the remainder of the rod, said carrier comprises a substantially horizontal arm having its inner end mounted on said laterally offset or eccentric upper portion of the vertical rod so that said arm may be adjusted angularly around the vertical axis thereof, and said vertically adjustable element comprises a feeder tube depending from the outer end of said arm into the molten glass in a feeder bowl or spout above an outlet in the bottom of the latter, said laterally offset or eccentric upper portion of the rod and the arm thereon being adjustable angularly to align the tube with said outlet and said rod being adjustable vertically to position the lower end of the tube at the desired level in relation to the upper end of the aligned outlet.

2. In combination, a glass feeding bowl or spout having an outlet in its bottom, a vertically movable vertical rod at one side of said bowl or spout, said rod having a laterally offset or eccentric vertical upper end portion adjustable angularly about the vertical axis of the remainder of said rod, a substantially horizontal arm having its inner end clamped to said laterally offset or eccentric upper end portion of said rod and extending laterally therefrom over said bowl or spout to position to overhang said outlet, a refractory tube suspended from said arm in position to depend into said bowl or spout in axial alignment with said outlet, and means to adjust said rod vertically to adjust the distance between the lower end of said tube and the upper end of said outlet.

MICHAEL A. KOLEDA.

REFERENCES CITED

The following references are of record in the file of this patent:

UNITED STATES PATENTS

| Number | Name | Date |
|---|---|---|
| 1,760,254 | Peiler | May 27, 1930 |
| 1,873,022 | Peiler | Aug. 23, 1932 |